Aug. 18, 1959   S. L. LANDIS   2,899,990
ELECTRICALLY OPERATED SAW MILL SET WORKS OF THE RATCHET TYPE
Filed June 1, 1955   3 Sheets-Sheet 1

INVENTOR
STANLEY L. LANDIS
BY
ATTORNEY

Aug. 18, 1959  S. L. LANDIS  2,899,990
ELECTRICALLY OPERATED SAW MILL SET WORKS OF THE RATCHET TYPE
Filed June 1, 1955  3 Sheets-Sheet 2

INVENTOR
STANLEY L. LANDIS
BY
ATTORNEY

Aug. 18, 1959     S. L. LANDIS     2,899,990
ELECTRICALLY OPERATED SAW MILL SET WORKS OF THE RATCHET TYPE
Filed June 1, 1955     3 Sheets-Sheet 3

INVENTOR
STANLEY L. LANDIS
ATTORNEY

United States Patent Office 2,899,990
Patented Aug. 18, 1959

2,899,990

ELECTRICALLY OPERATED SAW MILL SET WORKS OF THE RATCHET TYPE

Stanley L. Landis, Coopersburg, Pa.

Application June 1, 1955, Serial No. 512,483

15 Claims. (Cl. 143—120)

The present invention relates to sawmills and more particularly to the adjustment of the saw set works for selecting the thickness of the board or plank to be sawed.

Heretofore various types of saw set works have been provided for adjusting the relative position of a log to a saw for controlling the thickness of the board being sawed. Some saw set works have required manual labor for the adjustment by an operator and others have been partially or entirely power operated. However, these prior art structures have not been entirely satisfactory and the usual sawmill depends largely upon manual labor for obtaining the desired adjustment and has required stopping the carriage in a convenient location for the sawyer to make the necessary adjustment. Consequently, the prior art structures have not satisfactorily solved the problem of obtaining accurate controlled adjustment with a minimum of manual effort.

It is an object of the present invention to overcome the inadequacies of the prior art and to provide a sawmill with saw set works which can accurately be controlled from a stationary location by a relatively unskilled operator.

Another object of the present invention is to provide a control for the saw set works by which accurate control of the thickness of the board being cut may be obtained.

A further object is to provide means for rapidly moving the head blocks on the carriage in both forward and reverse directions.

Another object is to provide for accurate adjustment of the thickness of a board being sawed and to provide for rapid change from an adjustment to saw one thickness of a board to an adjustment to saw a different thickness of board.

A further object is to provide a control mechanism adjacent the carriage operating lever so that the sawyer operating carriage may also control the adjustment of the knees to select the width of board desired while the carriage is in motion.

Figures 1, 2:
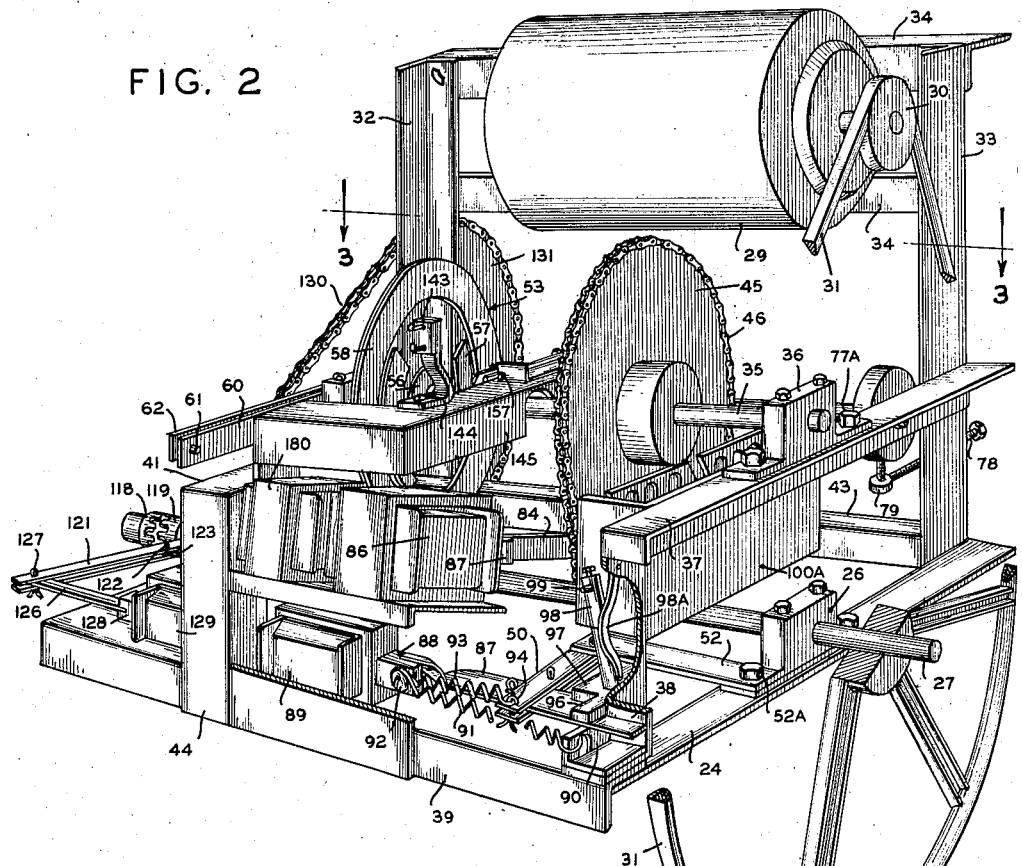
Figures 3, 4:
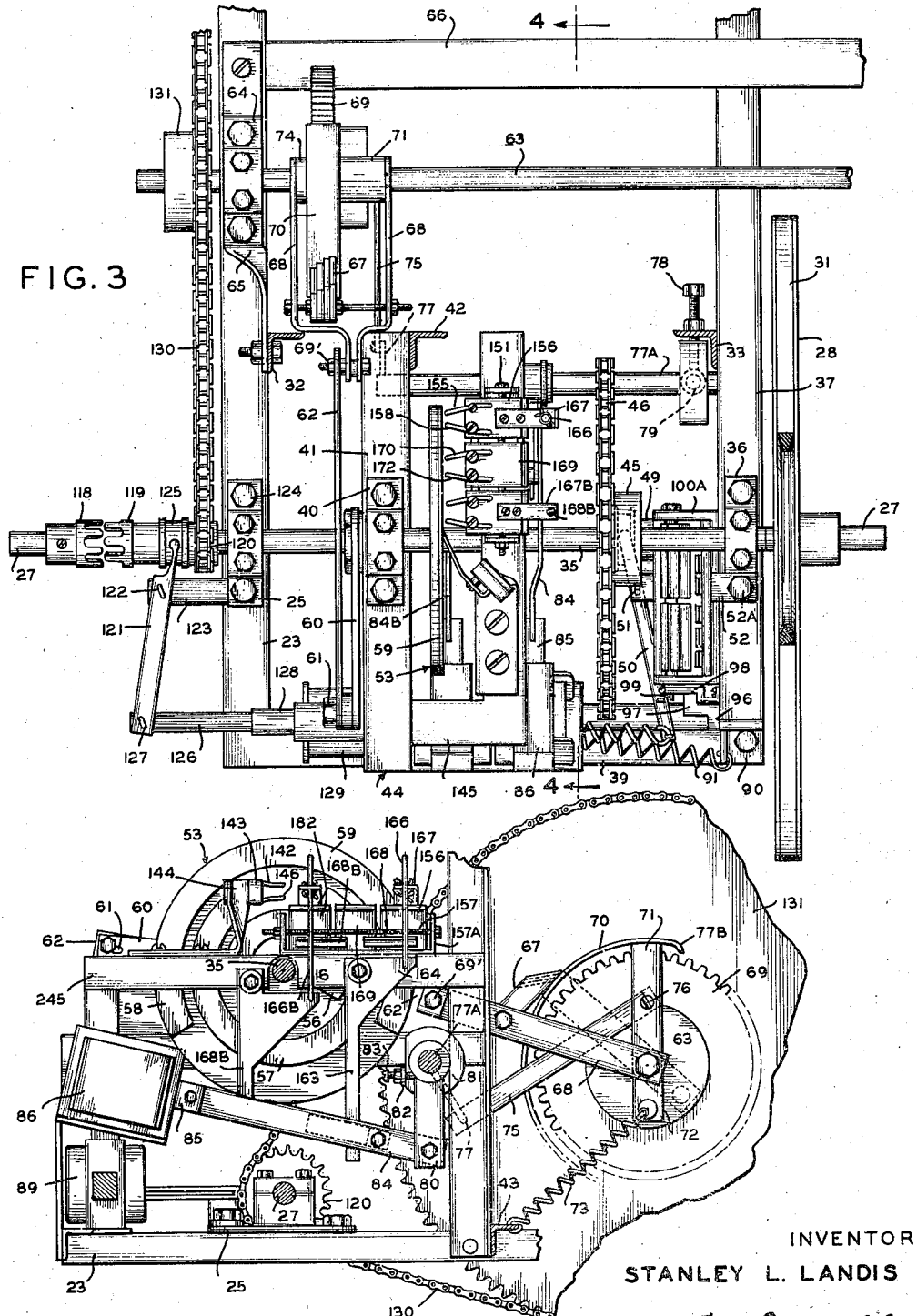
Figure 5:
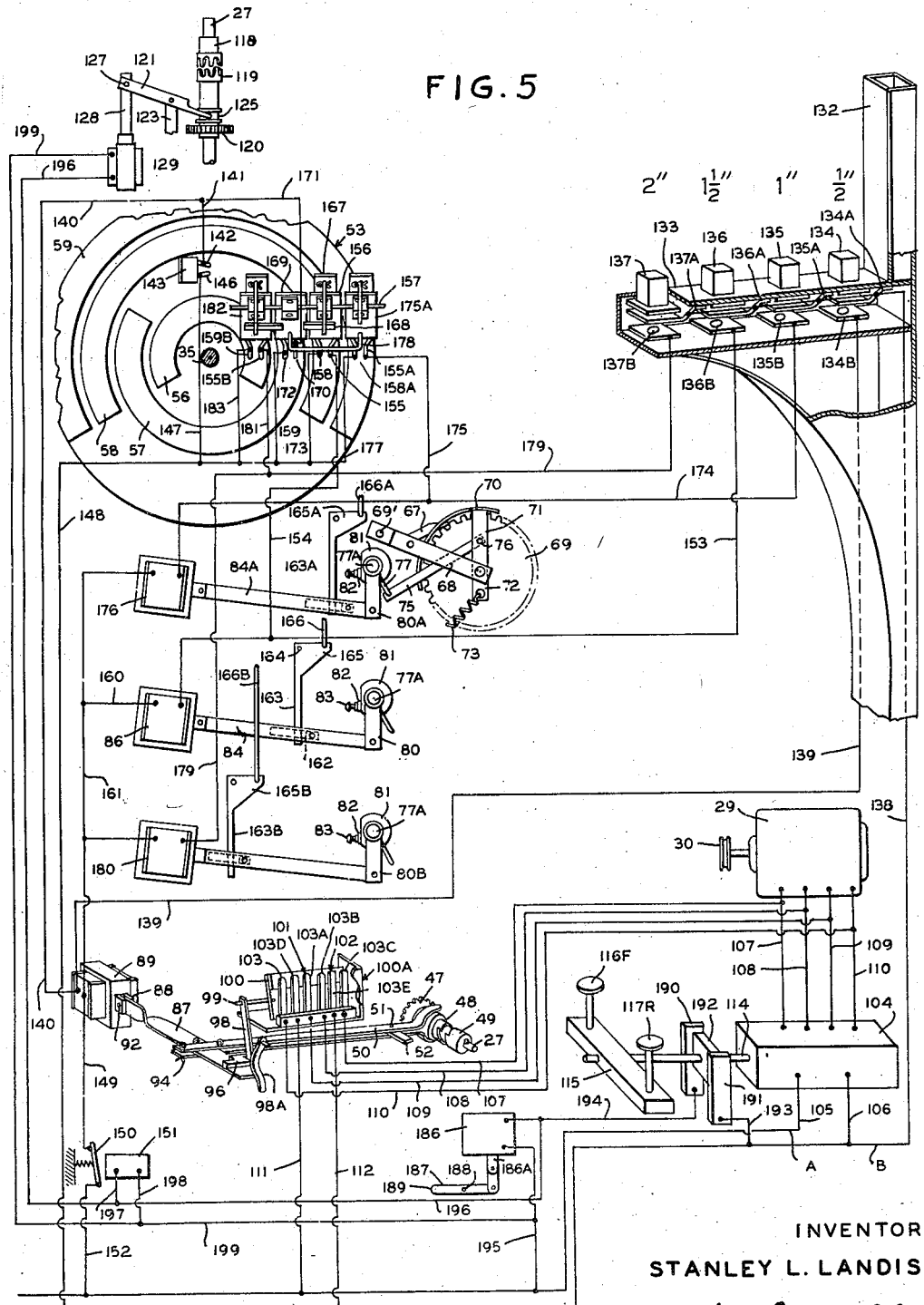

Other and further objects will be apparent as the description proceeds and in reference to the accompanying drawings wherein:

Fig. 1 is a perspective view of a sawmill showing the saw with the carriage supporting tracks mounted adjacent and parallel thereto and a carriage mounted on the tracks with headblocks for supporting a log and including control mechanism;

Fig. 2, a perspective with parts broken away of the control unit for mounting on the log supporting carriage;

Fig. 3, a sectional plan view taken on line 3—3 of Fig. 2 of the control unit for mounting on the carriage;

Fig. 4, a fragmentary section taken substantially on line 4—4 of Fig. 3 and illustrating the pawl guard and the electrical control by which the adjustment for one different thickness of board is obtained; and Fig. 5, a diagrammatic illustration of the electrical and mechanical control system.

Briefly, the present invention comprises a saw, a carriage mounted for movement past the saw and having a plurality of headblocks each supporting a movable knee adjustable toward and from the saw. Means are provided for moving the knees including a framework mounted on the carriage which framework carries a first shaft driven directly from an electric motor, said first shaft having a freely rotatable combination sprocket and clutch element thereon and a fixed clutch element on the first shaft cooperable therewith. A second shaft rotatably mounted on said framework and spaced from said first shaft is provided with a large sprocket. A chain connecting said large sprocket of the second shaft with the freely rotatable sprocket and clutch element on the first shaft causes simultaneous rotation of said first and second shaft when the combination sprocket and clutch element is in engagement with the fixed clutch element.

A timing mechanism in the form of a commutator is fixed on the second shaft and has a plurality of arcuate segmental shaped contact plates which are engaged by contact points in operative relation to said contact plates. A crank is fixed on the second shaft. A third shaft rotatably mounted in the framework is connected to the set works shaft on the carriage, such third shaft having a ratchet wheel fixed thereon; a series of pawls is mounted on an arm rotatably mounted on the third shaft to engage the ratchet wheel while a pitman extends from a crank fixed on the second shaft to the arm supporting the series of pawls. An arcuate shaped guard located between the pawls and the ratchet wheel is mounted on the third shaft and is adjustable to control the point of engagement of the pawl with the ratchet wheel so that the fixed throw of the crank can produce variations in the rotation of the third shaft. A solenoid operatively connected to the combination clutch and sprocket element on the first shaft is operatively associated with a motor control switch for operating the motor in the forward direction. Means including solenoids are provided for changing the position of the pawl guard and for maintaining the motor control solenoid in operative position throughout a complete revolution of said second shaft and commutator, said third shaft being positively connected to the means for moving the headblocks toward and from the path of the saw whereby the log may be accurately moved for cutting a board of selected thickness from a log. Control means are provided adjacent a sawyer's station for causing forward and reverse movement of the motor for moving the headblocks toward and from the saw. Clutching means are provided for causing positive driving of the third shaft from the first shaft for operation in large increments. Also, a series of buttons are mounted on the carriage movement control handle for operation by the sawyer to select a desired thickness of board without requiring other manipulation.

Referring more particularly to the drawing, a sawmill including a conventional saw blade 10 is mounted for power operation from a conventional source of power 11. A conventional trackway 12 supports a conventional carriage 13 mounted for longitudinal movement upon wheels 14 and such carriage has mounted thereon a plurality of L-shaped knees 15 which are mounted for transverse sliding movement in conventional guides and carry racks 16 which engage the usual pinion gears 17 fixed on the conventional set shaft 18. Such set shaft may be manually operated by a conventional ratchet mechanism 19 having a handle 20 connected to an operating rod 21 which may be engaged by a hand of a workman 22.

The knees carry the usual dogs and taper attachment and the like for retaining the log in proper position. The structure described is conventional and well known in the art and is presently manufactured and sold by the Frick Co., of Waynesboro, Pennsylvania. Upon the carriage of such a sawmill, a framework including horizontal members 23 and 24 carrying bearings 25 and 26 rotatably supports a first shaft 27 having a driving pulley 28 fixed at one end thereof. An electric motor 29 having a pulley 30 by means of a V-belt 31 drives the first shaft 27 in the same direction as the motor pulley 30, said motor being supported on suitable uprights 32, 33 and members 34 of the framework.

A second shaft 35 is supported at one end in a bearing 36 mounted on a horizontal angle member 37 which is supported at one end by upright 33 and at its other end by a vertical member 38 extending upwardly from the horizontal member 24, the horizontal member 24 being connected to the horizontal member 23 by angle members 39 and 43. The second shaft 35 is rotatably supported at its other end by a bearing 40 mounted on a horizontal member 41 supported at one end by an angle member 42 which extends upwardly from transverse member 43, the other end of member 41 being supported by upright 44 supported from angle member 39. A sprocket 45 is fixedly mounted on the shaft 35 and is connected by a chain 46 to a sprocket portion 47 of a combination sprocket and clutch element freely rotatable on said first shaft 27. A clutch portion 48 (Fig. 5) cooperates with a clutch element 49 fixed on the shaft 27. It will be noted that the combination sprocket and clutch element 47 and 48 are somewhat out of line when the clutches are in disengagement as shown in Figs. 3 and 5 and when the clutch elements 48 and 49 are in engagement, the sprocket portion 47 is in substantial alignment with the sprocket 45 so that in operative driving relation the chain is substantially straight.

The combination clutch and sprocket 48, 47 is operated by a conventional fork lever 50 pivotally mounted at 51 on a lateral extension 52 supported from horizontal member 24 by means of a forked bolt 52A, lever 50 being operated by a solenoid hereinafter described.

A timing mechanism in the form of a commutator 53 of insulating material is fixed on the second shaft 35 and carries a plurality of concentric arcuate plate segments 56, 57, 58 and 59 (Figs. 2, 4 and 5), a plurality of contacts cooperating with the commutator as hereinafter described (segments 56, 57 and 58 being shown only in Figs. 2 and 4 for simplicity).

A crank 60 is fixed on shaft 35 and is connected by a pivot 61 to a pitman 62. A third shaft 63 which may be integral with the saw set shaft 18 or otherwise positively connected thereto is rotatably mounted in a bearing 64 (Fig. 3) suitably supported from the horizontal member 23 on a horizontal element 65 supported by upright 32 and at one end by a longitudinal rail 66 of the log supported carriage at the other end. A plurality of different length pawls 67 are pivotally mounted on arms 68, 68 which straddle a ratchet wheel 69 fixed on shaft 63, the arms 68 being connected by a pivot 69' to the other end of the pitman 62 so that rotation of crank 60 causes oscillation of arms 68, 68 and the pawls 67 thereon.

An arcuate shaped guard 70 is fixed on a U-shaped support having legs 71, 74 and one leg 71 thereof having an extension 72 which is connected by a tension spring 73 to the fixed member 43 for maintaining the guard 70 in the normal full line position shown in Figs. 4 and 5, the legs 71 and 74 straddling the ratchet wheel 69 and lying within arms 68, 68. The guard 70 is moved from the full line position to the dotted line position shown in Fig. 4 and to any desired number of intermediate positions by means of a pitman 75 pivotally connected at one end by pivot 76 to the arm 71 of the U-shaped guard support and pivotally connected at its other end to a crank arm 77 which is fixed to a fourth shaft 77A by any suitable means, whereby rotation of shaft 77A will cause movement of the guard 70 through linkages 77, 75, 76 to vary the position of beak 77B of the guard and thereby control the point of engagement of pawls 67 with ratchet wheel 69 and consequently the amount of rotation of the shaft 63 and the movement of headblocks 15, 15, 15.

The initial position of the guard 70 is obtained by an adjustment of a threaded bolt 78 (Figs. 2 and 3) which is threaded into upright 33 and projects against an arm 79 fixed on the shaft 77A, the spring 73 normally urging the guard to the full line position and urging the arm 79 against the threaded bolt abutment 78, whereby the initial position of the guard can be accurately controlled. Since the length of the crank 60 is fixed, each revolution of the shaft 35 produces a definite displacement of pitman 62 and pawls 67 and the variation in the amount of turning of shaft 63 being controlled by the position of the guard 70.

For rotating the shaft 77A selected amounts, a plurality of substantially similar arrangements are provided, one such arrangement including an arm 80 freely rotatable on shaft 77A and a collar 81 fixed on the shaft 77 and carrying a lug 82 through which an adjusting crew 83 is threadedly mounted for engagement against the arm 80, whereby predetermined movement of the arm 80 in clockwise direction will permit lost motion until arm 80 contacts the screw 83 and thereafter, clockwise movement of the arm 80 will positively rotate the shaft 77A. The arm 80 is caused to rotate by a pitman 84 which is pivotally connected to the armature 85 of a solenoid 86.

Referring more particularly to Figs. 2, 3 and 5, the forked lever 50 of the clutch and sprocket combination 48, 47 embraces a bar 87 which is connected by pivot 92 to an armature 88 of a solenoid 89 and such bar 87 being slidably mounted at its other end on a bearing formed by angle 90. A spring 91 connected to the pivot 92 of the armature 88 and the angle 90 normally urges the armature to its extended position as shown and another spring 93 also connected to the armature pivot 92 is connected to the outer end of the arm 50 by any suitable means such as a cotter pin 94 whereby the solenoid 89 exerts a resilient force on the clutch, forked lever 50 preventing damage to the clutch and permitting reverse rotation of shaft 27.

Fixedly mounted on the bar 87 is a Z-shaped member 96 having its inner leg 97 in engagement with a switch operating arm 98 fixed to a shaft 99 secured to an insulating plate 100 of a motor operating switch 100A. Closing the switch 100A will cause rotation of the motor 29 in a forward direction to move knees 15, 15, 15 toward the saw 10 without reverse rotation of combination clutch and sprocket element 47, 48. When plate contacts 101, 102 engage the plurality of spring contacts 103 of switch 100A the contact 101 engages three of the spring contacts 103, 103D, 103A and the contact 102 engages three different contacts 103B, 103E, 103C to carry electrical energy to the motor for forward operation as is well understood in electrical arts.

The arm 98 is normally urged in a clockwise direction as viewed in Figs. 2 and 5 by a leaf spring 98A mounted on upright 38 to cause the plate contacts 101 and 102 to make electrical contact with contacts 103. It will be observed that the leaf spring 98A is of insufficient strength to close the contact 101, 102 against the tension of the spring 91 and, therefore, the contacts 101 and 102 are normally out of contact with spring contacts 103 and the freely rotatable clutch 48 is normally out of engagement with the clutch element 49 fixed on shaft 27. In this condition it will be evident that the shaft 27 may be rotated in either direction without producing any effect.

The motor 29 may be rotated in either a forward or reverse direction and this may be accomplished by a conventional reversing switch 104 connected to power lines A, B by leads 105, 106 and connected to the motor 29 by the four leads 107, 108, 109 and 110, which leads 107, 108, 109 and 110 are connected to the spring contacts 103, 103A, 103B and 103C, respectively, which cooperate with the plate contacts 101, 102. Other contacts 103D and 103E are connected to lines A and B, respectively, through leads 111 and 112. The switch 104 is mounted in a casing 113 (Fig. 1) and a shaft 114 carries a lever 115 which may be provided with foot-engaging pedals 116, 117 which will operate the switch 104 to produce forward or reverse rotation, respectively, of the motor 29, forward rotation of the motor 29 being interpreted to be the feeding movement which would cause the headblocks to move toward the saw and the reverse rotation being that which would cause the headblocks to move away from the saw.

Continuous forward or reverse movement of the headblock

For moving the headblocks 15, 15 a greater distance, a direct drive between the shaft 27 and shaft 63 is provided and the forward and reverse motion of the motor 29 is accomplished by the switch 104 operated by foot pedals 116 and 117. The shaft 27 is driven as previously explained from the motor 29 through pulley 30 and belt 31 and belt pulley 28 on shaft 27. However, rotation of shaft 27 does not produce any useful results without operation of one of the clutches thereon. A clutch element 118 is fixed to the shaft 27 by any suitable means and a combination clutch element 119 and sprocket 120 is moved by means of a forked lever 121 pivoted at 122 to a horizontal member 123 which is fixed to the frame member 122 by a bolt 124. The fork of the lever 121 engages in a groove 125 of the combination clutch and sprocket element. The lever 121 is operated by an arm 126 connected by a pivot 127 to the armature 128 of a solenoid 129. It will be apparent that when solenoid 129 has actuated the clutch element 119 that element engages clutch element 118, thereby positively connecting the shaft 27 to the sprocket 120, a chain 130 extending around sprocket 131 affixed on the shaft 63 causes a continuous forward or reverse rotation of the shaft 63 in accordance with the direction of rotation of the motor 29.

Operation

Upon reference to Fig. 5, the conventional hand lever 132 which controls the feeding and return movement of the log supporting carriage has a lateral extension 133 in which a plurality of switches including buttons 134, 135, 136 and 137 are located and each of such buttons engages a spring contact 134A, 135A, 136A, 137A connected together by an electrical conducting lead 138 which extends to line B of the power supply. Each of the spring contacts cooperates with a corresponding fixed contact 134B, 135B, 136B and 137B, respectively, and such fixed contacts are connected through suitable leads to other control elements. Contact 134B is designed for the smallest increment of movement of the headblocks 15, 15 in which the pawl guard 70 remains in its original position as shown in Figs. 3, 4 and 5. The fixed contact 134B is connected by a lead 139 to one terminal of the solenoid 89 and connected by another lead from the said one terminal of the solenoid 89 by a lead 140 to another lead 141 connected to a one spring contact 142 on a fixed insulated support 143 mounted on bracket 144 on a horizontally positioned U-shaped frame 145 (Figs. 2, 3 and 4) the horizontal U-shaped frame 145 being suitably supported on the framework. The other spring contact 146 of the fixed insulated support 143 is connected by a lead 147 to a second lead 148 which is permanently connected to a line A of the power supply.

Assuming that the smallest thickness of board is to be cut, the operator presses the button 134 for a sufficient length of time to carry current from line B through lead 138 and spring contact 134A to fixed contact 134B to lead 139 to the one contact of solenoid 89, the other connection of solenoid 39 being connected by a lead 149 to an armature 150 of a solenoid 151 to another lead 152 permanently connected to line A of the power supply thereby completing a circuit through solenoid 89 energizing such solenoid to move the armature 88 and the operating bar 87 to a position in which the Z-shaped element 96 disengages from the arm 98, the arm 98 being spring urged by spring 104 so that plate contact 101 makes electrical contact with spring contacts 103, 103D and 103A, while plate contact 102 makes electrical contact with spring contacts 103B, 103E and 103C thereby completing a circuit from lines A and B through leads 111, 112 and switch 100A and through leads 107, 108, 109 and 110 to the motor 29, causing the motor to rotate in a forward direction. Simultaneously, the clutch element 48 is engaged with clutch element 49 and rotation of shaft 27 caused by the motor 29 causes rotation of the clutch element 48 and the sprocket 47, the chain 49 causing sprocket 45 to be rotated causing rotation of shaft 35 which causes the commutator 53 fixed on the shaft 35 to rotate segmental arcuate shaped plate contact 57 to engage contacts 142 and 146, thereby completing the circuit from line A through lead 148, lead 147, contact 146, segmental contact plate 57, contact 142, lead 141, and lead 140 to solenoid 89 thereby energizing solenoid 89 even though switch 134 is open since the other connection to solenoid 89 is connected through lead 149, armature 150 and lead 152 to the line A. Therefore, the solenoid 89 remains energized as long as plate contact 57 remains in contact with spring contacts 142 and 146. As soon as the plate contact 157 runs out from under the spring contact 142, 146, the solenoid 189 is deenergized.

It will be understood that the rotation of shaft 35 for a complete revolution results in rotating the crank arm 60 a complete revolution thereby moving pitman 62 and parallel pawl supporting arms 68 with pawls 67 thereon over the guard 70 until the pawls 67 engage the teeth of ratchet 69 after the pawl 67 passes over the beak 77B of the guard, thereby rotating the ratchet wheel 69 a definite amount and also rotating shaft 63 to which the ratchet wheel is fixed, such shaft 63 causing rotation of the conventional saw set shaft 18, the pinion gears 17 thereon, thereby moving the headblocks 15 toward the saw a definite amount, for example, one half inch. It will be apparent that the headblocks 15 will be moved after the carriage has moved the logs out of the path of the saw 10 so that the log will be moved over the predetermined distance, for example, one half inch, and the next saw cut can be made by the operator 22 moving the handle 132 in a direction to cause the carriage to carry the log into the path of the saw so that the half inch board may be cut from the log.

Assuming that a board of 1½ inch thickness is to be cut, the operator 22 presses the button 136, thereby closing a circuit from line B to lead 138, spring contact 137A to fixed contact 136B to a lead 153 to solenoid 86 and also from lead 153 to a lead 154 to a spring contact 155 mounted on a pivoted insulating plate 156 which is pivotally mounted on a supporting shaft 157 mounted on suitable lugs 157A on U-frame 145. The other spring contact 158 on insulating plate 156 is connected by a lead 159 to lead 148 to line B. However, no current passes through from spring contact 155 to spring contact 158 until such spring contacts are caused to engage arcuate contact segment 58 and this is caused by the energization of solenoid 86 from switch 136 through lead 153 to solenoid 86 and thence by lead 160 to lead 161 connected to solenoid 89 and through lead 149, relay switch 150 and lead 152 to line 80. Immediately upon energization of solenoid 86, the armature thereof is drawn inwardly moving link 84 to the left as viewed in Figs. 5 and 4 causing an abutment guide 162 on pitman 84 to engage arm 163 of a bell crank lever pivoted at 164 and having the other arm 165 thereof connected to a link 166 which link 166 is connected by the equivalent of the pivotal connection to an extension 167 on the insulated plate 156 thereby causing contacts 155 and 158 to engage plate contact 58 completing a circuit which will maintain the solenoid 86 energized even though push button 136 is released and spring contact 136A becomes disengaged from fixed contact 136B. A laterally extending lug 168 (Fig. 5) is fixed on insulating plate 156 and the projecting end thereof engages a pivotal insulating plate 169 which carries a spring contact 170 which is connected by a lead 171 to lead 140 and to contact 142 of insulating support 143. The other contact 172 on pivoted insulating plate 169 is connected by lead 173 to lead 148 and thence to power line A.

It will be understood that when rod 166 is drawn downwardly pivoting insulating plate 156 causing contacts 155 and 158 to engage segmental plate 58, that insulating plate 169 will also be pivoted about shaft 157 because of engagement by lug 168 on plate 156 thereby causing contacts 170 and 172 to engage segmental plate 57 and since contacts 170 and 172 are connected parallel with contacts 142 and 146, respectively, of fixed insulating plate 143, the solenoid 89 is immediately energized when push button 136 closes the switch contacts 136A, 136B causing the motor 29 to rotate in a forward direction by allowing leaf spring 104 to close switch 100A and causing the clutch elements 48 and 49 to engage causing rotation of shaft 35 through sprocket elements 47, 45 and chain 46, the motor switch 100A remaining closed and the solenoid 86 remaining continuously energized by the engagement of spring contacts 155 and 158 with segmental plate 58 which is caused by a downward movement of rod 166 which is held in its downward position by the solenoid 86.

Solenoid 86 simultaneously moves the arm 80 which is pivotally connected to link 84 until such arm 80 engages adjusting screw 83 and further movement of arm 80 against adjustment screw 83 causes rotation of shaft 64 causing simultaneous movement of arm 77 and movement of link 75 which in turn causes movement of the guard 70 through arms 71 and 74 which are pivotally connected to link 75, thereby withdrawing the guard 70 and moving the same in a counter-clockwise direction as viewed in Figs. 4 and 5, and the beak 77B will be moved a definite distance and will be held thereby the solenoid 86 throughout the cycle. The pawls 67 will be caused to move over the portion of the guard 70 between the pawls 67 and the beak 77B by the action of crank 60 and pitman 62 on pawl supporting arms 68 and the pawls 67 will therefore engage the ratchet wheel 69 over a greater distance because of the withdrawal of the guard 70 relative to the arc of engagement caused by the depression of button 134 and therefore the ratchet wheel 69 will rotate a greater amount upon closing switch 136 than upon closing switch 134 causing a greater rotation of shaft 63 and thereby greater rotation of shaft 18 on the carriage resulting in a movement, for example, of one and one half inches corresponding to an increment of adjustment of 1½ inches or cutting of a board 1½ inches thick.

A different thickness of board may be cut by depressing the button 135 and actuating the corresponding switch and through lead 174 and lead 175 to a contact 155A of a pivoted insulating plate 176, lead 174 continuing to a solenoid 175A which is similar to solenoid 86 and has its other terminal connected to lead 161 to line A. Another lead 177 extends from the other contact 158A of pivoted insulating switch 176 to lead 148 to line B thereby activating the structure for a cycle, the operation resulting from closing switch 135 is designed to produce one inch, for example, of movement of the headblocks 15, 15. To cause operation of the insulating plate switch 169, a U-shaped member 178 is fixed on the insulating plate 176 and abuts the insulating plate 169 permitting the insulating plate 169 to be moved without causing movement of the insulating plate 176, the U-shaped member 178 corresponding to the lug 169 of insulating plate 156.

The push button switch 137 is connected by a lead 179 to one terminal of a solenoid 180, the other terminal of the solenoid being connected to lead 161 and from lead 179 another lead 181 extends to one contact 155B of a switch 182, the other contact 158B of such switch being connected by lead 183 to lead 148 and thence to line B. The solenoid 180 operates a bell crank 163B, 165B in a manner similar to the way solenoid 86 operates bell crank 163, 165. The switch 137 is arranged to produce an increment of movement of the headblocks of two inches, for example. Since the operating mechanism from the solenoids 86, 176, and 180 are substantially similar, the corresponding parts of the mechanism activated by solenoids 176 and 180 are described by the use of the same reference numerals used in describing the operations performed by solenoid 86 followed by the letters A or B, respectively, the solenoid 176 and the structure operated thereby being omitted from the drawings except in Fig. 5 to avoid complexity. It will be observed, however, that the number of solenoids 86, 176 and 180 may be increased or decreased as desired to correspond with the different numbers of increments of thickness of board desired. It will also be evident that the cycle of adjustment may be repeated for two cycles to obtain a selected adjustment, by adjustment of screws 83, 83A, 83B the size of the increments may be changed for greater or less thickness of board.

It will be observed that when switch 134 is actuated for merely an instant, no appreciable movement of shaft 35 occurs because the energization of solenoid 89 depends upon a continuous depression of the switch 134 and the arcuate segmental contact 57 being out of engagement with spring contacts 142 and 146, the contact switch 134 must be held closed a sufficient length of time to permit clutch 48, 49 to engage and rotate shaft 35 until the arcuate shaped contact 57 comes into engagement with spring contacts 142 and 146 and thereafter the operation is controlled by the arcuate segment 57 even though the switch 134 is allowed to open and the operation continues until the arcuate segment 57 passes completely past spring contacts 142 and 146 at which time the crank will be substantially in the position shown in Figs. 2, 3 and 4, the shaft 35 being stopped in a definite position at all times. When one of the other switches 135, 136 and 137 is actuated, a corresponding one of the solenoids 176, 86 and 180 is activated resulting in movement of the pawl guard 70 a definite amount so that pawls 67 will engage the ratchet teeth over a predetermined arcuate movement. When any one of the switches 135, 136 and 137 is closed the corresponding solenoids 176, 86, or 186 causing instantaneous activation of insulating plate 169 and closure of contacts 170 and 172 with arcuate segmental plate 57 requiring the completion of a cycle of operation before the motor 29 is stopped.

The head blocks may also be controlled by the usual lever 20 having the extension link 21 with a hand-engaging loop 184 by means of which the link may be rotated to disengage certain of the pawls in the conventional Frick Co. ratchet mechanisms of the hand setting set works and receder 185. It is desirable to have the pawls disengaged from the ratchets of the set works when extensive adjustment is made by foot pedals 116 or 117 and accordingly a solenoid 186 may be mounted upon the carriage or on a portion of the lever 20 which solenoid 186 actuates an armature 186A connected to a lever 187 which may be pivoted at 188 to a fixed point with the other end 189 engageable with the pawls or the operating mechanism therefore to release the pawls from the corresponding ratchets. The solenoid 186 is energized by switch contacts 190 and 191 between which movable cam-shaped contact 192 is located such cam-shaped contact being fixed to and preferably insulated from the shaft 114 and being so designed as to close a circuit between contacts 190 and 191 before switch 104 can cause actuation of the motor 29 so that the pawls on the set works 185 will be disengaged before the set works shaft 18 is rotated when motor 29 is operated by switch 104. The circuit from contact 191 being completed through a lead 193 to line B and the circuit from contact 190 being completed through lead 194 to one contact of solenoid 186, the other contact of solenoid 186 being connected by a lead 195 to line A. It will thus be seen that the pawls will be disengaged from the ratchet wheels in the set works 185 to prevent wear on such pawls when a large increment of adjustment is obtained by the operator 22 pressing on pedal 116 to produce forward adjustment of the head blocks or upon the operator stepping on pedal 117 to produce rearward adjustment of the headblocks, the switch 104 being normally open.

A safety device to prevent a short circuit and to prevent any possibility of simultaneous operation of the set works by any of the switches 134 to 137 and the foot pedals 116 and 117 is provided in the form of a normally closed relay switch 150 connected to power line A by lead 152, a lead 149 from relay switch 150 being connected to one terminal of the solenoid 89, such relay switch 150 is normally closed so that actuation of any of the switches 134–137 will produce the desired increment of adjustment as previously described. However, in the event that one of the switches 134–137 is closed at the same time that a foot pedal 116 or 117 is depressed, the actuation produced by the switches 134 or 137 will be ineffective. This may be accomplished by energization of solenoid 151 from contacts 190 and 191 by the depression of either foot pedal 116 or 117, which causes the cam contact 192 to engage contacts 190 and 191 before switch 104 is closed, the contact 191 being connected by lead 193 to line B and the contact 190 being connected by lead 194 and lead 196 and a lead 197 to one contact of the solenoid 151, the other contact of the solenoid 151 being connected by lead 198 to the lead 199 which is connected to lead 195 which in turn is connected to power line A, thereby energizing solenoid 151 and causing the armature 150 thereof to be drawn to open such relay switch 150, thereby preventing energization of solenoid 89 and preventing actuation of the motor 29 by the button switches 134 to 137.

When the foot pedals 116 or 117 are depressed, as stated previously, the cam 192 makes electrical contact with contacts 190 and 191 before the switch 104 is moved sufficiently to operate motor 29. Contact 190 is connected to clutch operating solenoid 129 through leads 194, 196, the other terminal of solenoid 129 being connected by a lead 199 to lead 195 to line A, the contact 191 being connected by lead 193 to line B, thereby completing the circuit and causing the clutch 119 to engage and thereafter the motor switch 104 is actuated and the motor is started, thereby causing rotation of shaft 27 and sprocket element 120 of clutch element 119 to cause the sprocket 131 to be rotated causing rotation of shaft 63 and rotation of set works shaft 18 and movement of the head blocks in accordance with the foot pedal being depressed.

It will therefore be seen that the operator 22 has complete control of the entire operation of the sawmill and from his single station can produce the large increments of adjustment of the headblocks or the accurate measured increments of movement by the use of the switches operated by buttons 134 to 137 and mounted on the handle 132. The handle 132 controls movement of the carriage in the usual way. Also the operator can operate the headblocks manually by use of the link 21 which can operate the set works and reader in the usual manner.

To carry the control current through the range of movement of the log carrying carriage, a cable 200 (Fig. 1) extends from switch casing 113 which houses switch 104 under the tracks 12 and away from the saw and up to an overhead trolley 201 on which a plurality of yokes 202 supported by pulleys riding on the trolley 201 support coils of the electrical cable 200 with one end of the cable extending downwardly through or along a post 203 to control mechanism within the framework. Such framework and control is covered by housing 204 which conceals the operating mechanism. The supply of power is to the control mechanism with a minimum of interference. It will be apparent that the control circuit could be carried by other means such as conductive trolleys or the like, but this arrangement is believed to be particularly advantageous since the coils of the cable 200 may collapse and expand similar to coils of springs, the trolley wire 201 serving as a suitable track or support which is well out of the path of the workmen and the logs thereby avoiding danger to the persons in the sawmill and preventing damage to the control system.

The ratchet release solenoid 186 may be mounted directly on the carriage and operatively connected to the conventional dog release structure on the well known manually operated Frick Company saw set works. Also, the ratchet release solenoid 187 may release the ratchet of the saw set works which is automatically operated by the reverse movement of the carriage and in such arrangement the wiring is simplified by not requiring a flexible connection to the solenoid as in the modification in which the clutch release solenoid is mounted on the operating handle 20.

It is contemplated that a three phase 220 volt source of electrical power (not shown) may be used and reverse switches of a suitable well known type will be used with such power.

Also the drive from the motor 29 to the shaft 27 may be made through a speed reducer by direct connection without requiring the use of a belt.

It will be obvious to those skilled in the art that various changes may be made in the invention without departing from the spirit and scope thereof and therefore the invention is not limited by that which is illustrated in the drawings and described in the specification, but only as indicated in the appended claims.

What is claimed is:

1. A sawmill comprising a saw, a carriage movable forwardly and rearwardly relative to said saw, a plurality of headblocks mounted on said carriage, a slidable knee on each headblock means on said knees and carriage to retain a log, means to move said knees toward and from said saw for adjustment of the thickness of a board being cut from the log, said means including a framework structure mounted on said carriage, a motor on said framework, a first shaft rotatably mounted on said framework and driven from said motor, a second shaft mounted on said framework, a sprocket fixed on said second shaft, a freely rotatable combination sprocket and clutch element mounted on said first shaft and slidable thereon, a second clutch element fixed on said first shaft and cooperable with said combination sprocket and clutch element for positively driving the latter, a chain connecting said sprockets whereby the said sprockets will be driven in timed relation, a commutator fixed on said second shaft, contact points in permanent engagement with said commutator, a plurality of movable contacts on said framework for engagement with said commutator, a crank on said second shaft, a pitman connected to said crank, a third shaft, a ratchet wheel fixed on said third shaft, a pawl mounted on an arm rotatable on said third shaft for engagement with the ratchet wheel, said pitman being connected by the arm on which said pawl is mounted, a guard mounted on said third shaft and located between said pawl and said ratchet wheel for controlling the point of engagement of said pawl with said ratchet wheel, a solenoid for operating said clutch on said first shaft, a solenoid controlled switch connected to said clutch operating solenoid for causing said motor to rotate in a forward direction, means to selectively actuate said clutch operating solenoid and for thereafter holding said solenoid in operative position whereby said crank will make a complete revolution to move said pawl through one cycle and advance said ratchet wheel a definite amount, said third shaft being positively connected to the means to move said knees toward and from the path of the saw whereby the log may be accurately moved for cutting a board therefrom.

2. The invention according to claim 1 in which manually powered means are also provided for controlling the movement of the knees toward and from the path of the saw.

3. The invention according to claim 2 in which means are provided for varying the position of the ratchet guard whereby different thicknesses of board may be cut, and manual means for selecting the position of said ratchet guard.

4. A power control unit for producing a predetermined rotation in a shaft, said control unit including a framework having a motor thereon, a first shaft rotatably mounted in said framework and driven from said motor, a second shaft mounted in said framework and positively connectable to said first shaft by means of a first clutch, a timing device on said second shaft, a third shaft, means to rotate said third shaft a selected amount upon rotation of said second shaft through a complete rotation, means to actuate said first clutch and energize said motor to initiate a cycle of operation and means for thereafter automatically continuing the cycle by said timing means and upon completion of said cycle said first clutch and motor will be de-energized, and means for operating said third shaft from said motor through a second clutch independently of said timing mechanism and said first clutch for producing unpredetermined amounts of rotation of said third shaft, the drive from said motor being directly to said first shaft.

5. A power control unit for producing a predetermined rotation in a shaft on a movable carriage from a stationary control station, said control unit including a framework having a motor thereon, a first shaft rotatably mounted in said framework and driven from said motor, a second shaft mounted in said framework and positively connectable to said first shaft by means of a clutch to rotate said second shaft a complete rotation, a timing device on said second shaft, a third shaft, means to rotate said third shaft a selected amount upon rotation of said second shaft through a complete rotation, and means to actuate said clutch and energize said motor to initiate a cycle of operation and means for thereafter automatically continuing the cycle by said timing means and upon completion of said cycle said clutch and motor will be de-energized, and means at the control station for initiating the actuation of said clutch and the energizing of said motor, and for predetermining the extent of rotation of said third shaft.

6. The invention according to claim 5 in which other means are provided for operating said third shaft from said motor independently of said timing device and said first clutch for producing unpredetermined amounts of rotation of said third shaft.

7. A control unit for application to a sawmill having a fixed saw, a movable carriage with knees for supporting a log for movement toward and from the saw, and manually powered ratchet means to move the knees toward the saw, said control system including a unit for mounting on the carriage, power operated means on the unit for moving said knees toward and from the saw, a control for location adjacent the saw blade, said control including means to operate said power operated knee moving means on the carriage a definite predetermined selected amount, means to move the knees toward and from the saw an unpredetermined amount, and means to automatically release the ratchets of said manually powered means when the control means for moving the knees an unpredetermined amount is operated.

8. Automatic adjusting means comprising a framework, a motor mounted on said framework, said motor driving a first shaft through speed reduction means, a second shaft mounted on said framework, control means to initiate operation of said motor and continue the operation of the motor for a complete turn of said second shaft, a crank mounted on said second shaft, a third shaft for positive connection to the shaft for moving the knees on the headblocks of a carriage toward and from the saw, a ratchet wheel on said third shaft, and pawl means operated by said crank for moving said ratchet forwardly to rotate said third shaft a definite amount for each rotation of said second shaft, and means whereby rotation of said third shaft can be varied from said definite amount for producing movement of the knees to obtain a board of different thickness.

9. The invention according to claim 8 in which means are provided for alternatively directly connecting said motor to said third shaft to produce adjustments of indeterminate extent.

10. Knee adjusting means for a carriage comprising a framework, a motor mounted on said framework for producing rotary motion, a crank shaft mounted for rotation on said framework, a crank on said crank shaft control means to cause operation of said motor to produce one revolution of said crank shaft and stop, a pitman connected to said crank, a pawl operated by said pitman, a shaft having a circular ratchet mounted on said framework, said pawl cooperating with said ratchet whereby the reciprocation of said pawl by said crank will cause a definite rotation of said shaft having a ratchet, and means selectively operable whereby said pawl may be engaged or disengaged from said ratchet at pre-determined selected positions whereby the extent of rotation of said ratchet shaft can be definitely controlled for each revolution of said crank shaft.

11. The invention according to claim 10 in which means are provided whereby the same motor may serve to rotate said ratchet shaft through a separate train of mechanism without operation of said crank shaft.

12. The invention according to claim 10 in which a guard is provided for normally holding the pawl out of contact with said ratchet and the position of the guard can be controlled to vary the effective arc of movement of the pawl while in contact with said ratchet.

13. Knee adjusting means for log engaging knees of a carriage of a sawmill comprising a framework for mounting on the carriage, a motor mounted on said framework, a first shaft rotatably mounted on said framework and driven from said motor, a second shaft mounted on said framework, a first clutch between said first shaft and said second shaft for driving said second shaft, a commutator fixed on said second shaft, contact points for engagement with said commutator, a solenoid for operating said clutch on said first shaft, a switch connected to said first clutch solenoid, means for causing said motor to rotate in a forward direction and means to actuate said first solenoid, said commutator and said contact points serving thereafter to continue the energization of said first solenoid and said motor for a pre-determined extent of rotation of said second shaft whereby the knees of the carriage will be advanced a definite amount for moving the knees of the carriage a definite amount toward the saw, whereby a log may be accurately moved for cutting a board therefrom.

14. Saw set works adjusting means comprising a framework, a motor mounted on said framework, said motor driving a first shaft through speed reduction means, a second shaft mounted on said framework, commutator means on said second shaft connectable to control said motor, contact points mounted on said frame for engagement with said commutator for controlling said motor to produce a complete rotation of said second shaft, means for operating said motor, a crank mounted on said second shaft, a third shaft for positive connection to the shaft for moving the knees on the headblocks of a carriage toward and from the saw, a ratchet wheel on said third shaft, and pawl means operated by said crank for moving said ratchet forwardly to rotate said third shaft a definite amount for each revolution of said second shaft, and means to control the effective engagement of said pawl means with said ratchet and thereby the extent of rotation of said third shaft by a complete rotation of said second shaft.

15. A control unit for application to a sawmill having a fixed saw, a movable carriage with knees for supporting a log for movement toward and from the saw and means to adjust the knees, said control system including a unit for mounting on the carriage, means on the unit for moving the knees of the sawmill toward and from the saw blade, a control for the movement of said knees toward and from the saw and adapted for location adjacent the saw and off the carriage, said control including means to operate the unit on the carriage to move the knees a definite pre-determined amount according to a certain actuator and separate means to move the knees toward and from the saw any unpredetermined amount under the control of the operator, and means to prevent simultaneous actuation of the control means to operate the knees a definite predetermined amount and to prevent the simultaneous actuation of the control means to move the knees toward and from the saw any unpredetermined amount to assure positive control at all times.

References Cited in the file of this patent

UNITED STATES PATENTS

| | | |
|---|---|---|
| 24,913 | Smith et al. | July 26, 1859 |
| 493,546 | Dodge | Mar. 14, 1893 |
| 660,045 | Carroll | Oct. 16, 1900 |
| 857,663 | Osborn | June 25, 1907 |
| 1,725,861 | Grueter | Aug. 27, 1929 |
| 1,846,687 | Mentor | Feb. 23, 1932 |
| 2,125,371 | Field | Aug. 2, 1938 |
| 2,355,381 | Lear | Aug. 8, 1944 |
| 2,561,346 | De Vlieg et al. | July 24, 1951 |
| 2,574,393 | Hult | Nov. 6, 1951 |
| 2,597,355 | Masuy | May 20, 1952 |
| 2,661,036 | Balch et al. | Dec. 1, 1953 |
| 2,696,853 | Balch et al. | Dec. 14, 1954 |
| 2,721,588 | Roberts | Oct. 25, 1955 |